Patented Jan. 16, 1934

1,943,427

UNITED STATES PATENT OFFICE 1,943,427

PRODUCTION OF ORGANIC ACIDS

Hans Franzen, Mannheim, Hans Beller, Ludwigshafen-on-the-Rhine, and Martin Luther, Mannheim, Germany, assignors to I. G. Farbenindustrie Aktiengesellschaft, Frankfort-on-the-Main, Germany, a corporation of Germany No Drawing. Application October 11, 1929, Serial No. 399,090, and in Germany November 1, 1928

11 Claims. (Cl. 260—116)

The present invention relates to the production of organic acids.

Products are obtained by the oxidation of high molecular aliphatic compounds, in particular of paraffin wax, Montan wax and the like, which contain, in addition to unchanged initial material, acid oxidation products in the free or combined state and sometimes also other neutral oxidation products as for example alcohols. The removal of the unsaponifiable material, that is to say the non-oxidized material and any alcohols present and the like, cannot be effected without further treatment and in most cases is even then incomplete.

We have now found that a practically complete separation of even large quantities of unsaponifiable material from the oxidation products is effected in an advantageous manner by treating the aqueous soap solution obtainable after the treatment of the oxidation products with basic agents such as solutions of caustic alkalies, aqueous ammonia solutions, solutions of alkali metal carbonates and the like, if desired after the separation of the greater part of the unsaponifiable materials by allowing them to settle or by centrifuging and the like, with a water-insoluble organic extraction agent. After separating a part of the soap solution which is free from unsaponifiable materials, the remaining emulsion is separated by adding small quantities of low molecular aliphatic alcohols, in particular ethyl or methyl alcohol whereby two layers are formed.

For example ligroin, benzine or ethers may be employed as the extraction agent. These agents have the advantage that the extraction may be carried out in the hot whereby a solidification is avoided. For example by the employment of a benzine having a boiling point of from 70° to 100° centigrade the operation may be carried out at temperatures above 60° centigrade.

If a concentrated caustic alkali solution such as a from 25 to 50 per cent solution of caustic soda or potash be employed the addition of the alcohol may be made directly after saponification before the extraction; if desired a small quantity of water may be added to the saponified mass. By this method there is the particular advantage of performing the extraction with rather small quantities of extracting agent on account of the low volume of the mass to be extracted and also of avoiding the formation of emulsions during the extraction.

The acid constituents of the oxidation products may be set free from the soap solutions, which have been freed from unsaponifiable materials, by acidification; fatty acids may be still further purified in the usual manner for example by treatment with steam. The extraction agents may be distilled off from the dissolved unsaponifiable materials and may thus be recovered. The alcohol employed may similarly be recovered by distillation; if it is again to be employed for the process in accordance with the present invention it is not necessary to free the distillate from benzine and the like or from water. Also the mixture of alcohol and extracting agent recovered in the aforesaid manner after an operation by means of strong alkaline lyes as described above, can be employed as such in a following operation of extraction.

The following examples will further illustrate the nature of this invention, but the invention is not restricted to these examples. The parts are by weight.

*Example 1*

100 parts of an oxidation product of paraffin wax containing 20 per cent of unsaponifiable materials are treated with the quantity of caustic soda solution which is necessary for saponification. The soap solution obtained, after dilution to 500 parts with water is thoroughly shaken with 200 parts of benzine, having a boiling point of from 70° to 100° centigrade, at a temperature of 60° centigrade. From the emulsion which thus forms, 350 parts of clear aqueous soap solution practically free from unsaponifiable materials are obtained by centrifuging. To the remaining emulsion, which still amounts to 350 parts, 50 parts of methyl alcohol are added and the whole is then repeatedly thoroughly shaken, and the whole immediately separates into two sharply defined layers. The lower layer is an entirely clear soap solution while the upper layer contains the benzine, a part of the methyl alcohol employed and the unsaponified materials in a dissolved state. The fatty acids which are separated from the said soap solution by means of mineral acid contain only quite a small quantity of unsaponifiable materials.

*Example 2*

100 parts of an oxidation product of paraffin wax which contain 35 per cent of unsaponifiable matter are heated to boiling together with 105 per cent of the quantity of a 50 per cent caustic soda solution theoretically required for saponification, until complete saponification occurs, whereupon the mass is left standing whereby two layers are formed. The upper layer consisting of unsaponifiable matter is separated and the lower layer is diluted with half its volume of water. This solution is then incorporated with ⅓ of its volume of ethyl alcohol and ¾ of its volume of benzine and stirred for ¾ of an hour at 60° centigrade. After standing for a while the alcoholic solution is separated and the aqueous solution extracted again with the same quantity of benzine. After distilling off the benzine the soap and consequently the fatty acids obtainable therefrom are free from unsaponifiable matter.

*Example 3*

100 parts of an oxidation product of paraffin wax which contain 20 per cent of unsaponifiable matter are heated to boiling together with 105 per cent of the quantity of a 40 per cent caustic potash solution theoretically required for saponification, until complete saponification occurs. After adding 30 parts of water the soap solution is incorporated with 100 parts or methyl alcohol and extracted at about 60° centigrade, several times each with 200 parts of benzine of a boiling point range of from 70° to 100° centigrade. The separated clear soap solution is then decomposed by means of a mineral acid and the fatty acids which contain 1.5 per cent of unsaponifiable matter, are then blown with steam. The benzine is recovered from the solution of the extract by distillation and the methyl alcohol is distilled off from the soap solution so far as it has not been dissolved in the benzine employed for the extraction, either before or after acidifying the soap solution.

*Example 4*

100 parts of an oxidation product of paraffin wax which contain 40 per cent of unsaponifiable material are boiled with 110 per cent of the quantity of 18 per cent aqueous caustic potash solution theoretically required for saponification until complete saponification is obtained. After settling and drawing off the upper layer consisting of the major portion of unsaponifiable material present, the remaining soap solution is diluted with water up to 500 parts and then intimately shaken at 60° C. with 300 parts of a benzine boiling between 70° and 100° C. By centrifuging the emulsion formed about 250 to 300 parts of a clear soap solution are obtained which are free from unsaponifiable matter. The remaining 500 parts of the emulsion are incorporated with 80 parts of ethyl alcohol and intimately shaken, whereby a quick separation into two layers occurs. When separating the lower layer consisting of pure soap solution and decomposing it with mineral acid the fatty acids obtained are free from unsaponifiable material. In the same manner pure fatty acids can be obtained from an oxidation product of a higher petroleum fraction such as of gas oil.

What we claim is:—

1. In the production of organic acids from oxidation products of high molecular aliphatic compounds, the steps which comprise treating said oxidation products with an aqueous solution of a saponifying agent, adding to the aqueous solution of the crude soaps, so formed, a water-insoluble non-aromatic organic solvent, thereby forming two layers of liquid, the lower of which consists entirely of soap solution and the upper of which contains soap solution, solvent and the unsaponifiable portion of the initial oxidation product, withdrawing so much of the lower layer as is free from unsaponifiable matter, thereby leaving an emulsion containing solvent, soap solution and unsaponifiable matter, breaking said emulsion by adding thereto a lower member of the aliphatic alcohol series, thereby breaking the emulsion into two layers, the lower of which consists entirely of soap solution and the upper of which contains the aforesaid solvent and the unsaponifiable matter and separating the layers so formed.

2. In the production of organic acids from oxidation products of high molecular aliphatic compounds, the steps which comprise treating said oxidation products with an aqueous solution of a saponifying agent, mechanically separating the major portion of unsaponifiable material present in the aqueous solution of the crude soaps, so formed, adding to the remaining part of said solution a water-insoluble non-aromatic organic solvent, thereby forming two layers of liquid, the lower of which consists entirely of soap solution and the upper of which contains soap solution, solvent and an unsaponifiable portion of the initial oxidation product, withdrawing so much of the lower layer as is free from unsaponifiable matter, thereby leaving an emulsion containing solvent, soap solution and unsaponifiable matter, breaking said emulsion by adding thereto a lower member of the aliphatic alcohol series, thereby breaking the emulsion into two layers, the lower of which consists entirely of soap solution and the upper of which contains the aforesaid solvent and the unsaponifiable matter and separating the layers so formed.

3. In the production of organic acids from oxidation products of high molecular aliphatic compounds, the steps which comprise treating said oxidation products with an aqueous solution of a saponifying agent, adding to the aqueous solution of the crude soaps, so formed, a non-aromatic liquid hydrocarbon, thereby forming two layers of liquid, the lower of which consists entirely of soap solution and the upper of which contains soap solution, said liquid hydrocarbon, and the unsaponifiable portion of the initial oxidation product, withdrawing so much of the lower layer as is free from unsaponifiable matter, thereby leaving an emulsion containing said liquid hydrocarbon, soap solution and unsaponifiable matter, breaking said emulsion by adding thereto a lower member of the aliphatic alcohol series, thereby breaking the emulsion into two layers, the lower of which consists entirely of soap solution and the upper of which contains the aforesaid liquid hydrocarbon and the unsaponifiable matter and separating the layers so formed.

4. In the production of organic acids from oxidation products of high molecular aliphatic compounds, the steps which comprise treating said oxidation products with an aqueous solution of a saponifying agent, mechanically separating the major portion of unsaponifiable material present in the aqueous solution of the crude soaps, so formed, adding to the remaining part of said solution a non-aromatic liquid hydrocarbon, thereby forming two layers of liquid, the lower of which consists entirely of soap solution and the upper of which contains soap solution, said liquid hydrocarbon and an unsaponifiable portion of the initial oxidation product, withdrawing so much of the lower layer as is free from unsaponifiable matter, thereby leaving an emulsion containing said liquid hydrocarbon, soap solution and unsaponifiable matter, breaking said emulsion by adding thereto a lower member of the aliphatic alcohol series, thereby breaking the emulsion into two layers, the lower of which consists entirely of soap solution and the upper of which contains the aforesaid liquid hydrocarbon and the unsaponifiable matter and separating the layers so formed.

5. In the production of organic acids from oxidation products of high molecular aliphatic compounds, the steps which comprise treating said oxidation products with an aqueous solution of a saponifying agent, mechanically separating the major portion of unsaponifiable material present in the aqueous solution of the crude soaps, so formed, adding to the remaining part of said solution a nonaromatic liquid hydrocarbon, thereby forming two layers of liquid, the lower of which consists entirely of soap solution and the upper of which contains soap solution, said liquid hydrocarbon and an unsaponifiable portion of the initial oxidation product, withdrawing so much of the lower layer as is free from unsaponifiable matter, thereby leaving an emulsion containing said liquid hydrocarbon, soap solution and unsaponifiable matter, breaking said emulsion by adding thereto an aliphatic alcohol containing not more than 2 carbon atoms, thereby breaking the emulsion into two layers, the lower of which consists entirely of soap solution and the upper of which contains the aforesaid liquid hydrocarbon and the unsaponifiab'e matter and separating the layers so formed.

6. In the production of organic acids from oxidation products of high molecular aliphatic compounds, the steps which comprise treating an oxidation product of paraffin wax with an aqueous solution of a saponifying agent, mechanically separating the major portion of unsaponifiable material present, adding to the remaining aqueous solution of the crude soaps, so formed, a non-aromatic liquid hydrocarbon, thereby forming two layers of liquid, the lower of which consists entirely of soap solution and the upper of which contains soap solution, said liquid hydrocarbon and an unsaponifiable portion of the initial oxidation product, withdrawing so much of the lower layer as is free from unsaponifiable matter, thereby leaving an emulsion containing said liquid hydrocarbon, soap solution and unsaponifiable matter, breaking said emulsion by adding thereto an aliphatic alcohol containing not more than 2 carbon atoms, thereby breaking the emulsion into two layers, the lower of which consists entirely of soap solution and the upper of which contains the aforesaid liquid hydrocarbon and the unsaponifiable matter and separating the layers so formed.

7. In the production of organic acids from oxidation products of high molecular aliphatic compounds, the steps which comprise treating said oxidation products with an aqueous solution of a saponifying agent, adding to the aqueous solution of the crude soaps, so formed, while warming, a non-aromatic liquid hydrocarbon, thereby forming two layers of liquid, the lower of which consists entirely of soap solution and the upper of which contains soap solution, said liquid hydrocarbon and the unsaponifiab'e portion of the initial oxidation product, withdrawing so much of the lower layer as is free from unsaponifiable matter, thereby leaving an emulsion containing said liquid hydrocarbon, soap solution and unsaponifiable matter, breaking said emulsion by adding thereto a lower member of the aliphatic alcohol series, thereby breaking the emulsion into two layers, the lower of which consists entirely of soap solution and the upper of which contains the aforesaid liquid hydrocarbon and the unsaponifiable matter and separating the layers so formed.

8. In the production of organic acids from oxidation products of higher molecular aliphatic compounds, the steps which comprise treating an oxidation product of paraffin wax with an aqueous solution of a saponifying agent, adding to the aqueous solutions of the crude soaps, so formed, while warming, a non-aromatic liquid hydrocarbon, thereby forming two layers of liquid, the lower of which consists entirely of soap solution and the upper of which contains soap solution, said liquid hydrocarbon and the unsaponifiable portion of the initial oxidation product, withdrawing so much of the lower layer as is free from unsaponifiable matter, thereby leaving an emulsion containing said liquid hydrocarbon, soap solution and unsaponifiable matter, breaking said emulsion by adding thereto a lower member of the aliphatic alcohol series, thereby breaking the emulsion into two layers, the lower of which consists entirely of soap solution and the upper of which contains the aforesaid liquid hydrocarbon and the unsaponifiable matter and separating the layers so formed.

9. In the production of organic acids from oxidation products of high molecular aliphatic compounds, the steps which comprise treating an oxidation product of paraffin wax with an aqueous solution of a saponifying agent, adding to the aqueous solutions of the crude soaps, so formed, while warming, a non-aromatic liquid hydrocarbon, thereby forming two layers of liquid, the lower of which consists entirely of soap solution and the upper of which contains soap solution, said liquid hydrocarbon and the unsaponifiable portion of the initial oxidation product, withdrawing so much of the lower layer as is free from unsaponifiable material, thereby leaving an emulsion containing said liquid hydrocarbon, soap solution and unsaponifiable matter, breaking said emulsion by adding thereto an aliphatic alcohol containing not more than 2 carbon atoms, thereby breaking the emulsion into two layers, the lower of which consists entirely of soap solution and the upper of which contains the aforesaid liquid hydrocarbon and the unsaponifiable matter, and separating the layers so formed.

10. In the production of organic acids from oxidation products of high molecular aliphatic compounds, the steps which comprise treating said oxidation products with an aqueous solution of caustic alkali of at least 25 per cent strength, adding to the aqueous solution of the crude soaps, so formed, while warming, a non-aromatic liquid hydrocarbon, thereby forming two layers of liquid, the lower of which consists entirely of soap solution and the upper of which contains soap solution, said liquid hydrocarbon and the unsaponifiable portion of the initial oxidation product, withdrawing so much of the lower layer as is free from unsaponifiable material, thereby leaving an emulsion containing said liquid hydrocarbon, soap solution and unsaponifiable matter, breaking said emulsion by adding thereto an aliphatic alcohol containing not more than 2 carbon atoms, thereby breaking the emulsion into two layers, the lower of which consists entirely of soap solution and the upper of which contains the aforesaid liquid hydrocarbon and the unsaponifiable matter, and separating the layers so formed.

11. In the production of organic acids from oxidation products of high molecular aliphatic compounds, the steps which comprise treating said oxidation products with an aqueous solution of caustic alkali of at least 25 per cent strength, adding to the aqueous solution of the crude soaps, so formed, while warming to about 60° C. a non-aromatic liquid hydrocarbon, thereby forming two layers of liquid, the lower of which consists entirely of soap solution and the upper of which contains soap solution, said liquid hydrocarbon and the unsaponifiable portion of the initial oxidation product, withdrawing so much of the lower layer as is free from unsaponifiable material, thereby leaving an emulsion containing said liquid hydrocarbon, soap solution and unsaponifiable matter, breaking said emulsion by adding thereto an aliphatic alcohol containing not more than 2 carbon atoms, thereby breaking the emulsion into two layers, the lower of which consists entirely of soap solution and the upper of which contains the aforesaid liquid hydrocarbon and the unsaponifiable matter, and separating the layers so formed.

HANS FRANZEN.
HANS BELLER.
MARTIN LUTHER.